US005265506A

United States Patent [19]

Aihara et al.

[11] Patent Number: 5,265,506

[45] Date of Patent: Nov. 30, 1993

[54] METHOD FOR FABRICATING A PERFORATED FILM AND ITS APPARATUS

[75] Inventors: Kintaro Aihara, Chiba; Tadashi Honda, Tokyo, both of Japan

[73] Assignees: Nippon Petrochemicals Company, Limited; Polymer Processing Research Inst., Ltd., both of Tokyo, Japan

[21] Appl. No.: 923,934

[22] PCT Filed: Jan. 10, 1992

[86] PCT No.: PCT/JP92/00012

§ 371 Date: Sep. 4, 1992

§ 102(e) Date: Sep. 4, 1992

[87] PCT Pub. No.: WO92/11977

PCT Pub. Date: Jul. 23, 1992

[30] Foreign Application Priority Data

Jan. 10, 1991 [JP] Japan .................................... 3-12437

[51] Int. Cl.[5] ......................... B23D 5/00; B23D 7/10; B26F 1/24

[52] U.S. Cl. .......................................... 83/16; 83/18; 83/30; 83/37; 83/72; 83/171; 83/175; 83/286; 83/346; 83/368

[58] Field of Search ................... 83/16, 18, 30, 37, 50, 83/62, 63, 70, 72, 171, 175, 368, 360, 286, 298, 304, 346, 76.8

[56] References Cited

U.S. PATENT DOCUMENTS 3,227,854 1/1966 Ramsey et al. ....................... 83/271

FOREIGN PATENT DOCUMENTS 41-19028 11/1966 Japan .

61-11760 4/1986 Japan .

62-44397 2/1987 Japan .

*Primary Examiner*—Hien H. Phan

*Attorney, Agent, or Firm*—Burns, Doane, Swecker & Mathis

[57] ABSTRACT

Method and apparatus for fabricating a perforated film comprising the steps of pinching a film material, (3) between a cutter roll (1) with cutting edges (12) and a backing roll (2) to press the cutting edges (12) to the film material (3) and driving, to rotate least one of the cutter roll (1) and the backing roll (2), to form holes such as slits in a film material. The apparatus is decelerated by a stop command signal of an apparatus, detecting the speed of the apparatus attaining a predetermined small speed, generating an advance stop signal when the apparatus is approaching a stop a condition, and displacing the backing roll (2) so that the cutter roll is separated from the backing roll.

8 Claims, 4 Drawing Sheets

METHOD FOR FABRICATING A PERFORATED FILM AND ITS APPARATUS

TECHNICAL FIELD

The present invention relates to a method for fabricating a perforated film such as a slit film or the like and its apparatus, and in particular, it relates to a method for fabricating a perforated film and its apparatus in which holes are formed in a film by cutting edges of a cutter roll while a film material is passed between the cutter roll and a backing roll.

BACKGROUND ART

As this type of method and apparatus for fabricating a perforated film, Japanese Examined Patent Publication (Kokoku) No. 61-11757, for example, discloses slits formed in thermoplastic film. In such apparatus, holes are formed in a film by cutting edges of a cutter roll while a film is passed between a cutter roll and a backing roll. Cutting edges of the cutter roll are heated to a temperature above a melting start point of the thermoplastic film, and these cutting edges are pressed to the film to form slits in the film.

In the apparatus as described above, the travelling device of the film and the cutter roll are often driven by separate motors, for simplifying the mechanism. Said motors are driven in synchronization, but, upon stopping the apparatus, the travelling device of the film and the cutter roll do not stop simultaneously because there is a difference in frictional resistance and inertia between the travelling device of the film and the cutter roll. In this regard, if the cutter roll and the film stop simultaneously, the cutting edges of the cutter roll rub against the film thereby causing damage to the film, and sometimes tearing the film.

In addition, even if the travelling of the film and the rotation of the cutter roll stop simultaneously, if the film in a stopping state maintains contact with the cutter roll, the film is excessively heated by the cutting edges of cutter roll, melts and adheres to the cutter roll and the backing roll. If the film adheres to the cutter roll and the backing roll, it is necessary to clean them. Also, in the case of the backing roller made from a polymer material, as disclosed in the above described Japanese Examined Patent Publication (Kokoku) No. 61-11757, there is a problem in that the backing roll is excessively heated by the cutting edges of the cutter roll and is subjected to considerable damage, thereby making it impossible to use said roll.

SUMMARY OF THE INVENTION

The object of the present invention is to solve the above described problems of the prior art and provide a method for fabricating a perforated film and an apparatus in which it is possible to prevent damage to a film and thermal adhesion of a film to the cutting edges and the backing roll, to thereby improve the working efficiency and reduce costs.

According to the present invention, there is provided a method for fabricating a perforated film from a film material, comprising the steps of pinching a film material between a cutter roll with cutting edges and a backing roll to press said cutting edges to the film material, driving to rotate at least one of the cutter roll and the backing roll, decelerating the speed of said one roll according to a stop command signal of an apparatus, displacing at least one of the cutter roll and the backing roll relative to the other roll so that said cutter roll is separated from the backing roll when the speed of said one roll attains a speed smaller than a predetermined speed, and completing the deceleration of said one roll.

With this arrangement, after the step of forming holes in the film, and such that at least one of the cutter roll and the backing roll is stopped, the film is forcibly separated from the cutter roll and does not contact the cutting edges of the cutter roll, and as a result, the film is not damaged, compared to when the film maintains contact with the cutting edges of the cutter roll.

Preferably, the method comprises detecting at least one of rotation speeds of the cutter roll and the backing roll and the travelling speed of the film material, comparing the detected speed with a predetermined speed close to the speed of the apparatus when stopped, and displacing at least one of the cutter roll and the backing roll relative to the other roll when the detected speed is smaller than the predetermined speed.

Also, an apparatus for fabricating a perforated film from a film material, comprises a cutter roll with cutting edges for forming holes in a film material, a backing roll arranged opposite the cutter roll, conveying means for conveying the film material so that the film material contacts the backing roll, rotational drive means for driving to rotate at least one of the cutter rolls and the backing roll, displacing means for displacing at least one of the cutter roll and the backing roll relative to the other roll between a first position in which said cutting edges of the cutter roll contacts the backing roll and a second position in which said cutting edges of the cutter roll are separated from the backing roll, warning signal before stop generating means for generating a warning signal before stop when the speed of at least one of the cutter roll and the backing roll becomes less than a predetermined speed, and driving means for driving the displacing means so that at least one of the cutter roll and the backing roll reach the second position when the advance stop signal is generated.

In this case too, after the step of forming holes in the film, and in the condition in which at least one of the cutter roll and the backing roll is stopped, the film is forcibly separated from the cutter roll and does not contact the cutting edges of the cutter roll, and as a result, the film is not damaged, compared to the case when the film maintains contact with the cutting edges of the cutter roll.

BRIEF DESCRIPTION OF THE DRAWINGS

The present invention will now be described by referring to the preferred embodiment as a specific example with reference to the accompanying drawings, in which.

BEST MODE FOR CARRYING OUT THE INVENTION

Figure 3:
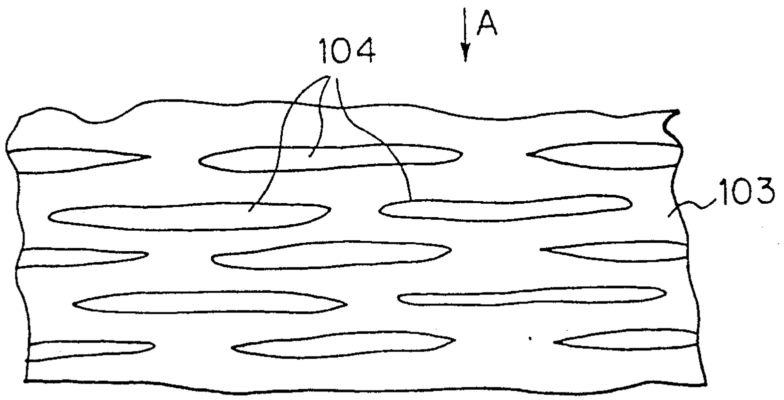
FIG. 3 is a plane view of the perforated film fabricated by the apparatus of FIG. 1.

FIG. 3 shows an example of a perforated film 103 fabricated in accordance with the present invention. The perforated film 103 comprises a film material having slits 104 formed therein. In FIG. 3, the longitudinal direction of the perforated film 103 (travelling direction of the perforated film 103) is shown by the arrow A and the slits 104 are formed elongatedly in a direction transverse to the longitudinal direction (travelling direction). However, the present invention is not limited to the perforated film 103 having the slits 104 of FIG. 3.

Figure 4:
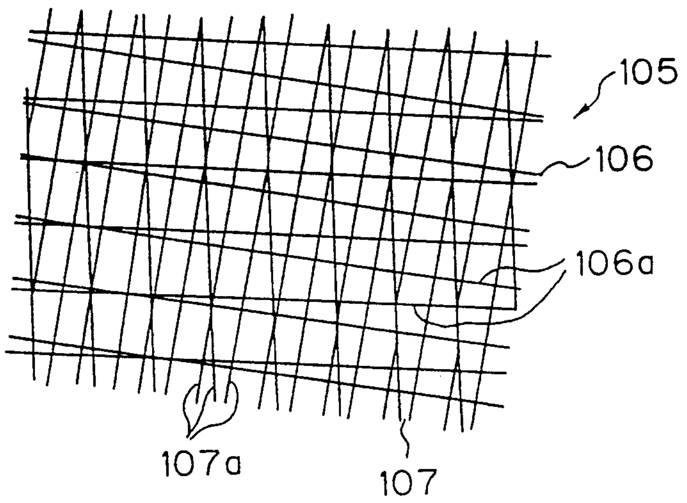
FIG. 4 is a plane view of a nonwoven fabric using the perforated film of FIG. 3.

FIG. 4 shows, as an application of the present invention, an example of a nonwoven fabric 105 using the perforated film 103 of FIG. 3. The nonwoven fabric 105 comprises a web 106 having a network structure comprising a narrow strip-like fibriform (ribbons) 106*a* extending like a weft of a woven fabric and a web 107 having a network structure comprising narrow strip-like fibriform (ribbons) 107*a* extending like a warp of a woven fabric. It is known that the web 106 having the weft-like ribbons 106*a* can be obtained by stretching the perforated film 103 in a direction perpendicular to the arrow A and transversely to the perforated film 103. Also, it is known that the web 107 having warp-like ribbons 107*a* can be obtained by fabricating a perforated film having slits extending elongatedly in the longitudinal direction of the web 107 and by stretching it in the longitudinal direction of the web 107.

Figure 5:
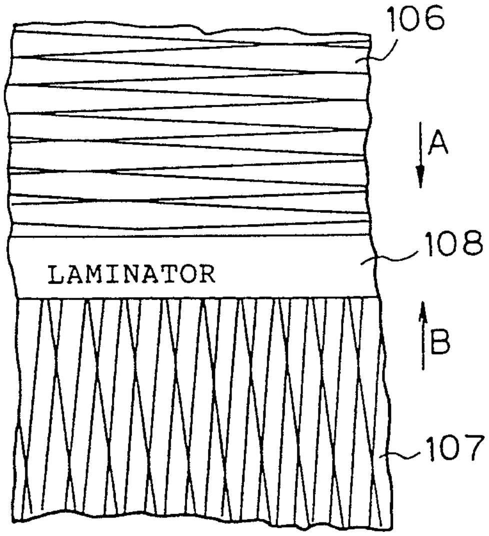
FIG. 5 is a view illustrating the formation of the nonwoven fabric of FIG. 4 by lamination.

FIG. 5 shows that the nonwoven fabric 105 of FIG. 4 is obtained by laminating the web 106 having weft-like ribbons 106*a* and the web 107 having warp-like ribbons 107*a* at a laminator 108. In this case, the web 106 having the weft-like ribbons 106*a* is conveyed in the direction of the arrow A, similar to the case of FIG. 3, and the web 107 having warp-like ribbons 107*a* is conveyed in the direction of an arrow B. The laminated nonwoven fabric 105 can be conveyed, for example, so that it rises perpendicular to the sheet in FIG. 5.

Figure 1:
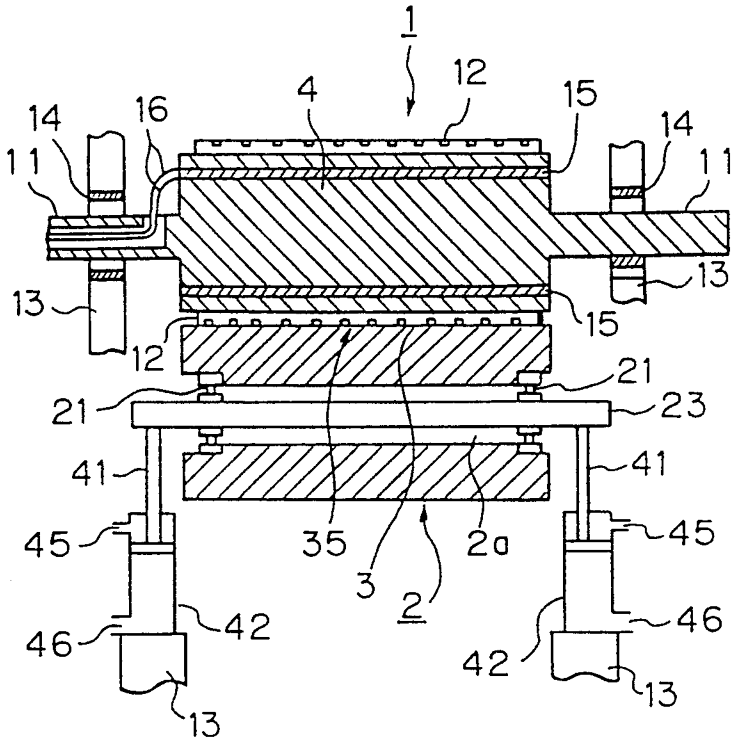
FIG. 1 is a cross-sectional view of an apparatus for fabricating a perforated film according to the embodiment of the present invention.
Figure 2:
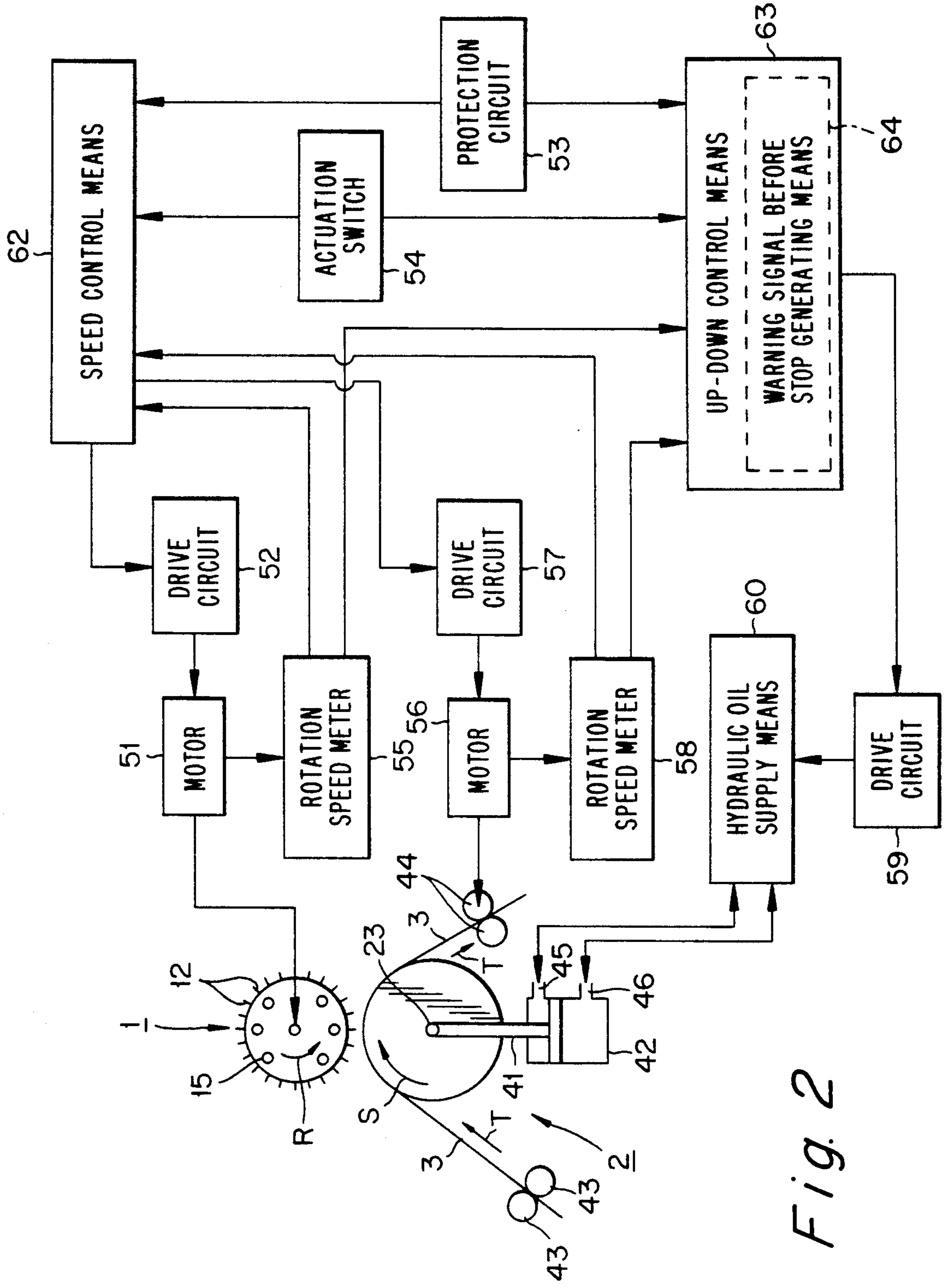
FIG. 2 is a side elevational view of the apparatus of FIG. 1, including conveying means and driving means.

In FIGS. 1 and 2, an apparatus for fabricating a perforated film according to the present invention forms the perforated film 103 of FIG. 3 from a thermoplastic film material 3. The apparatus for fabricating a perforated film comprises a frame of the apparatus 13, a cutter roll (slitter roll) 1, and a backing roll 2 arranged opposite to the cutter roll 1 below the cutter roll 1. The film material 3 is passed between the rolls 1 and 2 and pinched between these rolls. As shown in FIG. 2, the film material 3 is conveyed by a pair of pinch rollers 43 positioned on the upstream side of the cutter roll 1 and a pair of pinch rollers 44 positioned on the downstream side of the cutter roll 1, so that the film material 3 covers the upper surface portion of the backing roll 2 in a predetermined angle range and thus normally contacts the backing roll 2.

The cutter roll 1 is also called a slitter roll, and has a cylindrical body 4 and a plurality of cutting edges 12 provided transversely on the outer periphery of the cylindrical body 4. The cutting edges 12 extend axially of the cylindrical body 4 to form slits 104 transversely to the travelling direction (the direction of the arrow A in FIG. 3), and such rows of cutting edges 12 are arranged circumferentially. The cutter roll 1 has a central shaft 11 that is rotatably supported to the frame 13 of the apparatus by bearing 14 and driven by an electric motor 51 (FIG. 2) via pulleys and belts not shown. The motor 51 drives, in rotation, the cutter roll 1 in the direction of the arrow R.

Also, electric heaters 15 are provided inside the cutter roll 1 for heating the cutting edges 12 to a temperature above a melting start point of the film material 3. Electric wiring 16 connects the electric heaters 15 to an outside power source.

The backing roll 2 is hollow and thus has a central bore 13*a*. A support shaft 23 is inserted in the central bore 13*a* and rotatably supports the backing roll 2 by bearings 21. The backing roll 2 rotates freely and thus moves with the film material 3 and with the cutter roll 1. The backing roll 2 rotates in the direction of the arrow S, and the film material 3 travels in the direction of the arrow T. However, as shown in FIG. 2, the pinch rollers 44 on the downstream side of the cutter roll 1 are drive rollers that are driven by an electric motor 56, and the backing roll 2 is rotated by the pinch rollers 44 when the backing roll 2 is separated from the cutter roll 1. The peripheral speed of the cutter roll 1, the peripheral speed of the backing roll 2, and the travelling speed of the film material 3 are generally identical. Also, the pinch rollers 44 on the downstream side of the cutter roll 1 conveys the perforated film 103 having slits 104 formed therein, as shown in FIG. 3, by pulling, transversely and outwardly, both side edges of the perforated film 103.

As shown in FIGS. 1 and 2, hydraulic cylinders 42 are fixed to the frame of the apparatus. The hydraulic cylinders 42 have upwardly directed piston rods 41, and both ends of the support shaft 23 of the backing roll 2 are supported by the tips of the piston rods 41 of the hydraulic cylinders 42, respectively. The hydraulic cylinders 42 have ports 45 and 46 at both ends thereof for introducing or discharging hydraulic oil to move the piston rods 41 up or down by introducing hydraulic oil, from a hydraulic oil supply means 60 including valves or the like, into one of the ports 45 and 46, whereby it is possible to bring the backing roll 2 into a position at which the backing roll 2 presses the cutter roll 1, or into a position at which the backing roll 2 is separated from the cutter roll 1.

In FIG. 2, the motor 51 is driven by a drive circuit 52, the motor 56 is driven by a drive circuit 57, and the hydraulic oil supply means 60 is driven by a drive circuit 57.

The control device of the apparatus includes a protection circuit 53, an actuation switch 54, a speed control means 62, and an up-down control means 63. The actuation switch 54 includes a plurality of manual switches, i.e., at least, manual switches instructing a start and a stop of the motors 51 and 56, and a speed regulating handle. The protection circuit 53, for example, includes means for detecting abnormal matter such as an overload of the motors 51 and 56 and means for commanding the stop of the motors 51 and 56.

A rotation speed meter 55 is associated with the motor 51 and a rotation speed meter 58 is associated with the motor 56. These rotation speed meters 55 and 58 are connected to the speed control means 62. The protection circuit 53 and the actuation switch 54 are also connected to the speed control means 62. Accordingly, the speed control means 62 controls the motors 51 and 56 via the drive circuits 52 and 57, respectively.

In addition, the rotation speed meters 55 and 58 are also connected to the up-down control means 63, and the protection circuit 53 and the actuation switch 54 are also connected to the up-down control means 63. The up-down control means 63 includes a warning signal before stop generating means 64. The warning signal before stop generating means 64 generates an advance stop signal when the detected speed of at least one of the motors 51 and 56 attains a speed smaller than a predetermined speed when the stop command signal is input from the protection circuit 53 and the actuation switch 54. Accordingly, the up-down control means 63 causes one of the cutter rolls 1 and the backing roll 2 to be displaced relative to the other so that the cutter roll 1 is separated from the film material 3, based on the warning signal before stop. In the preferred embodiment, the backing roll 2 is moved downward while the cutter roll 1 is supported at a fixed position.

In this case, at least one of rotation speeds of the cutter roll 1 and the backing roll 2 and a travelling speed of the film material 3 is detected; the detected speed is compared with a predetermined speed close to a speed of the apparatus when stopped, and at least one of the cutter rolls 1 and the backing roll 2 are displaced relative to the other roll when the detected speed is smaller than the predetermined speed. In the preferred embodiment, the predetermined speed for generating the warning signal before stop is selected to 5 meter/minute.

In this way, according to the present invention, the cutting edges 12 of the cutter roll 1 are separated from the film material 3 when the warning signal before stop is generated, then the cutter roll 1 stops and thus the film material 3 stops with the backing roll 2. Therefore, it is possible to mitigate damage of the film material 3 and thermal adhesion of the film material 3 to the cutter roll 1.

Also, in the present invention, it is possible to use low density polyethylene, medium density polypropylene, high density polypropylene, isotactic polypropylene, and its mixture as the thermoplastic film material. It is also possible to add an additive, such as antioxidant, ultraviolet absorber, or the like to the thermoplastic film material. For the backing roll, it is possible to apply a roll having a roll surface with a highpolymer such as elastomer or the like, as described in the above described Japanese Examined Patent Publication (Kokoku) No. 61-11757.

Further, in the above described embodiment, the peripheral speed of the backing roll is substantially identical to the peripheral speed of the film but it is possible to set these speeds as different values. Also, the hydraulic cylinder is used for moving up and down the backing roll, it is possible to use other actuators such as a solenoid. Alternatively, it is possible to use a combination of a hydraulic cylinder and a solenoid for moving up and down the backing roll.

Further, in the above described embodiment, the film has transverse slits, but the present invention is not limited to the film having transverse slits and it is possible to form a film having longitudinal slits or oblique slits. Also, the present invention can form a film having circular holes, modified configuration holes, polygonal-shaped holes and so on, instead of slits.

INDUSTRIAL APPLICABILITY FIELD

As explained above, it is possible, according to the present invention, to obtain a perforated film capable of mitigating damage to a film and thermal adhesion of a film to a cutter roll, and to obtain a high quality web having a network structure from such a perforated film.

We claim:

1. Method for fabricating a perforated film from a film material, comprising the steps of:
   pinching a film material between a cutter roll with cutting edges and a backing roll to press said cutting edges to the film material,
   driving in rotation at least one of the cutter roll and the backing roll,
   decelerating the speed of said one driven roll according to a stop command signal of an apparatus,
   then displacing at least one of the cutter roll and the backing roll relative to the other roll so that said cutter roll is separated from the backing roll when the speed of said one driven roll attains a speed less than a predetermined speed, and
   completing the deceleration of said one driven roll.

2. Method for fabricating a perforated film according to claim 1, wherein said cutter roll is supported so as to rotate at a fixed position, and said backing roll is displaced relative to this cutter roll.

3. Method for fabricating a perforated film according to claim 1, wherein the method further comprises:
   detecting one of the rotation speed of the cutter roll, the rotation speed of the backing roll, and a travelling speed of the film material;
   comparing the detected speed with the predetermined speed; and
   effecting the displacing step when the detected speed is smaller than the predetermined speed.

4. Method for fabricating a perforated film according to claim 1, wherein a stop command signal of the apparatus comprises at least one of a stop command signal of the cutter roll, a stop command signal of the backing roll and a travelling stop command signal of the film material.

5. Method for fabricating a perforated film according to claim 1, wherein the film material comprises a thermoplastic resin film, and said cutting edges are heated to a temperature above a melting start point of the film material; the heated cutting edges being pressed to the film material.

6. Apparatus for fabricating a perforated film from a film material, comprising a cutter roll with cutting edges for forming holes in the film material, a backing roll arranged opposite the cutter roll, conveying means for conveying the film material so that the film material contacts the backing roll, rotational drive means for driving to rotate at least one of the cutter roll and the backing roll, displacing means for displacing at least one of the cutter roll and the backing roll relative to the other roll between a first position in which said cutting edges of the cutter roll contact the backing roll and a second position in which said cutting edges of the cutter roll are separated from the backing roll, advance stop signal generating means for generating an advance stop signal when the speed of at least one of the cutter rolls and the backing roll becomes less than a predetermined speed, and driving means for driving the displacing means so that at least one of the cutter roll and the backing roll is brought in the second position when the advance stop signal is generated.

7. Apparatus for fabricating a perforated film according to claim 6, wherein the arrangement is such that the advance stop signal generating means receives at least one of a rotation speed signal of the cutter roll, a rotating speed signal of the backing roll, a travelling speed signal of the film, a stop command signal of the cutter roll, a stop command signal of the backing roll, and a travelling stop command signal of the film material.

8. Apparatus for fabricating a perforated film according to claim 6, wherein the displacing means comprises a hydraulic cylinder movably supporting the backing roll relative to the cutter roll.

* * * * *